United States Patent [19]

Barack et al.

[11] 4,097,194

[45] Jun. 27, 1978

[54] REDUNDANT DISC

[75] Inventors: William N. Barack, Morrow; Charles H. Gay, Jr., Loveland; Stephen W. Beekman, Fairfield; Paul A. Domas, Cincinnati, all of Ohio

[73] Assignee: The United States of America as represented by the Administrator of the National Aeronautics and Space Administration, Washington, D.C.

[21] Appl. No.: 668,971

[22] Filed: Mar. 22, 1976

[51] Int. Cl.² .............................................. F01D 5/02
[52] U.S. Cl. ............................ 416/244 A; 416/214 A; 74/572; 29/463
[58] Field of Search .......... 416/200 A, 198 A, 214 A, 416/201 R, 212 A, 244 A; 74/572; 403/376, 364, 167, 168, 409; 29/463, 433, 526, 156.8 R

[56] References Cited

U.S. PATENT DOCUMENTS

| 840,310 | 1/1907 | Goldsborough | 416/214 A X |
|---|---|---|---|
| 1,318,091 | 10/1919 | Ljungström | 416/214 A |
| 2,539,730 | 1/1951 | DeFosse | 74/572 |
| 2,641,440 | 6/1953 | Williams | 416/214 A X |
| 2,657,008 | 10/1953 | Atkinson | 416/97 |
| 2,719,438 | 10/1955 | Schiefer | 74/572 |
| 2,773,169 | 12/1956 | Lees | 416/213 X |
| 2,825,124 | 3/1958 | Nichols et al. | 29/156.8 R |
| 2,918,252 | 12/1959 | Haworth | 416/97 |
| 3,108,782 | 10/1963 | Jannett | 416/214 A X |
| 3,253,842 | 5/1966 | Rabe | 403/364 X |
| 3,282,498 | 11/1966 | Smith | 74/572 X |
| 3,282,561 | 11/1966 | Frankel et al. | 416/218 |
| 3,356,339 | 12/1967 | Thomas et al. | 416/198 A X |
| 3,357,082 | 12/1967 | Beaney | 29/156.8 |
| 3,368,424 | 2/1968 | Clerk | 74/572 |
| 3,429,700 | 2/1969 | Wiegand et al. | 29/240 X |
| 3,662,619 | 5/1972 | Seeliger | 74/572 |
| 3,916,495 | 11/1975 | Klassen | 416/198 A X |

FOREIGN PATENT DOCUMENTS

| 74,422 | 7/1918 | Austria | 416/198 A |
|---|---|---|---|
| 902,004 | 8/1945 | France | 416/198 A |
| 1,144,537 | 2/1963 | Germany | 416/95 |
| 2,402,218 | 8/1974 | Germany | 403/364 |
| 588,393 | 5/1947 | United Kingdom | 403/376 |
| 1,432,875 | 4/1976 | United Kingdom | 416/95 |

Primary Examiner—Everette A. Powell, Jr.
Attorney, Agent, or Firm—Derek P. Lawrence; Norman T. Musial; John R. Manning

[57] ABSTRACT

A rotatable disc comprising a plurality of generally parallel plates tightly joined together for rotation about a hub. Each plate is provided with a plurality of angularly spaced lands projecting from a face thereof, the lands of each plate interposed in alternating relationship between the lands of the next adjacent plate. In this manner, circumferential displacement of adjacent sectors in any one plate is prevented in the event that a crack develops therein. Each plate is redundantly sized such that, in event of structural failure of one plate, the remaining plates can support a proportionate share of the load of the failed plate. In one embodiment, the plates are prevented from separating laterally through the inclusion of generally radially extending splines which are inserted to interlock cooperating, circumferentially adjacent lands.

13 Claims, 6 Drawing Figures

U.S. Patent  June 27, 1978  Sheet 1 of 2  4,097,194
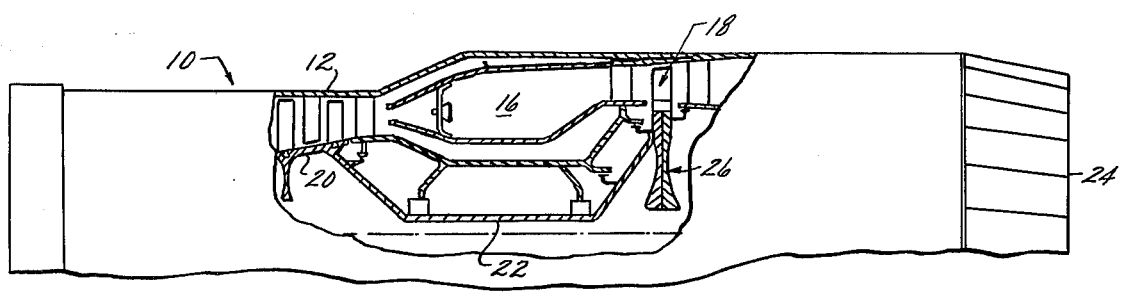
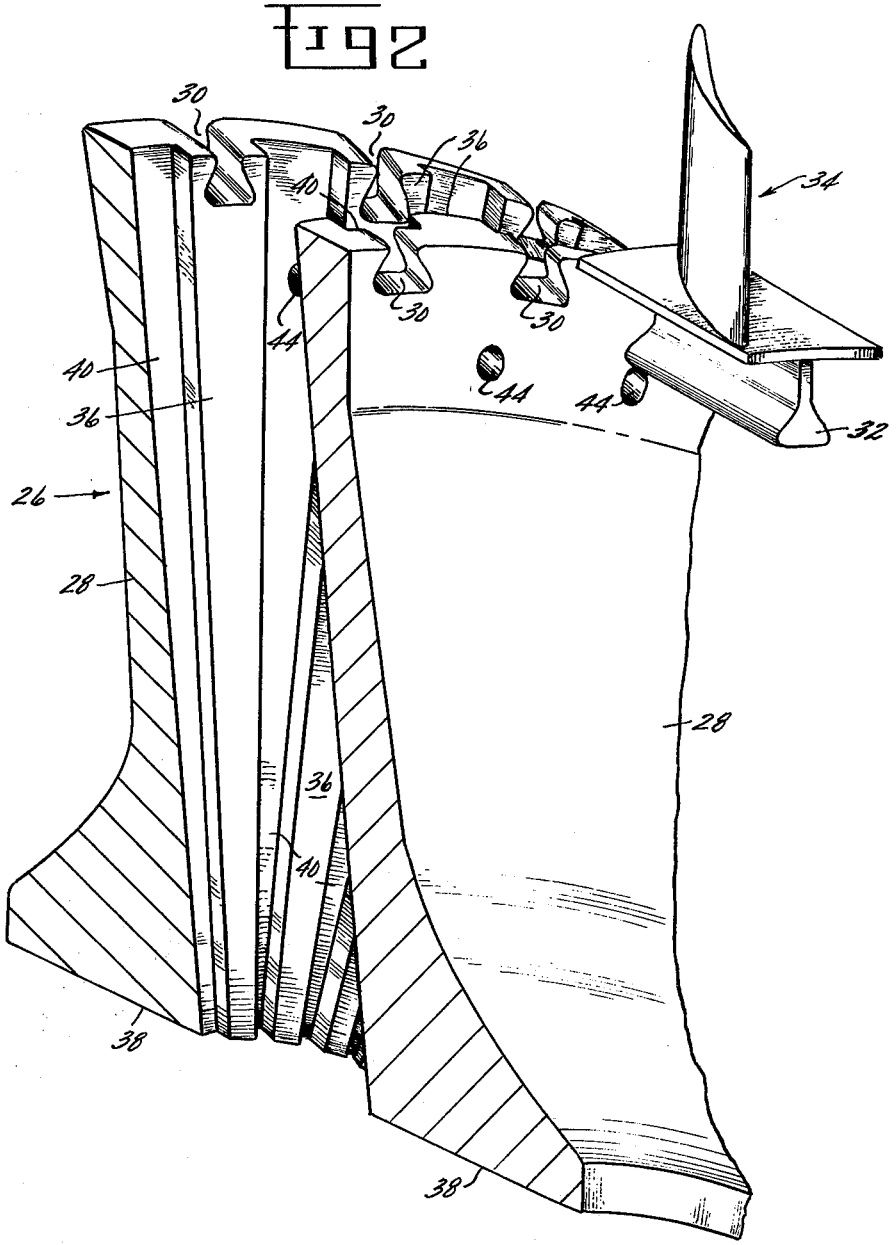

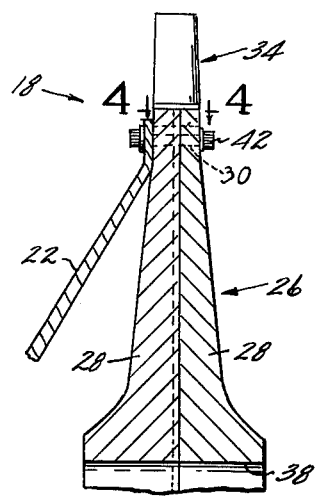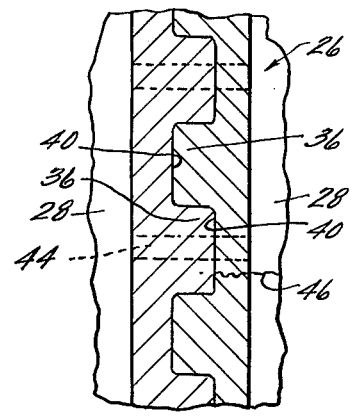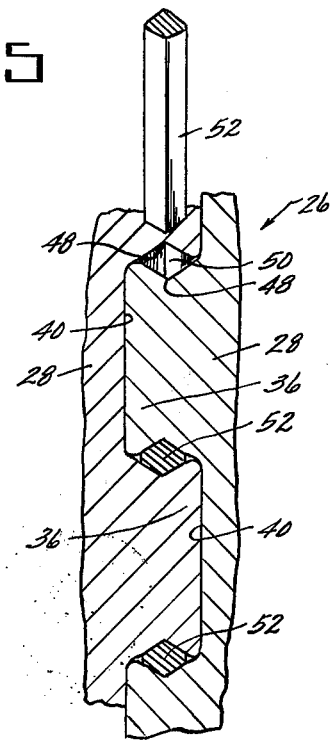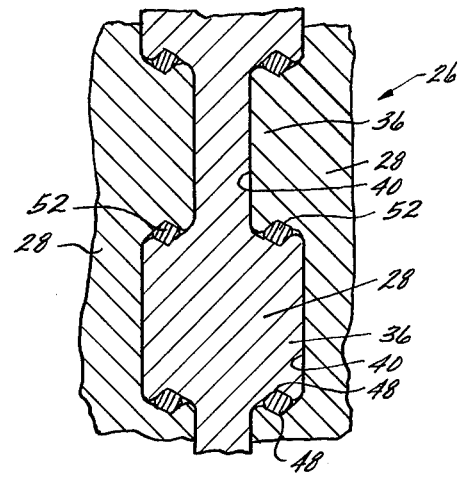

REDUNDANT DISC

The invention herein described was made in the performance of work under a NASA contract and is subject to the provisions of Section 305 of the National Aeronautics and Space Act of 1958, Public Law 85-568 (72 Stat. 435; 42 USC 2457).

BACKGROUND OF THE INVENTION

The present invention pertains to rotatable discs for use in gas turbine engines and the like and, more particularly, to rotatable discs of the redundant, no-burst variety.

The blades of an axial flow gas turbine engine compressor or turbine are normally attached to the rim of a rotatable disc or wheel by means of contoured blade roots which dovetail into cooperating slots in the disc. In the case of a turbine, the blades extract energy from a high energy, combusted gas stream to produce the torque necessary to drive the upstream compressor through a shaft connection with the disc and it is not uncommon to find turbines designed to operate at 10,000 rpm or higher. These high rotational speeds, coupled with the combined weight of a plurality of turbine blades, places high centrifugal loads upon the rim of the disc. Consequently, the disc must be of sufficient strength to resist not only these anticipated loadings, but also loadings due to temporary overspeed operation. However, in gas turbine engine applications where weight is a critical design parameter, the disc must also be as light as possible. Thus, there are competing considerations involved in any design: weight versus strength.

One consequence of designing to minimum weight is that in the event of a crack appearing in the disc, it will propagate rapidly since the disc lacks the necessary structure to resist or stop propagation. Within a small fraction of a second, the disc may fail catastrophically by bursting, sending shrapnel-like portions of the disc and the blades radially outward with potentially severe secondary consequences. Typically, it would be expected that at least a major portion of the engine would be destroyed.

There are several approaches which may be taken to minimize the effect of disc failure. One is to try to contain the failure and, thus, minimize secondary damage effects. However, this concedes loss of engine hardware and an exorbitant increase in weight to accommodate the containment hardware. Another approach would be to forestall burst by strengthening the disc with added material to lower disc stresses, thereby increasing life and overspeed capability. Studies have shown that for typical gas turbine engine high pressure turbine discs, the amount of material which would have to be added to preclude the propagation of a defect (such as a bore crack) would increase the weight beyond practical application. Furthermore, if a crack of length greater than a critical crack size is present, it will become unstable and propagate to failure with eventual bursting of the disc.

An alternative approach is to prevent the disc from bursting by fabricating the disc of redundance components such that, in event of failure of one component, the remaining structure can absorb the load at least temporarily until the machinery can be shut down and thus prevent further damage. While this latter approach increases overall engine weight, the increase will not be as great as a containment system, and the potential for increased reliability and reduction in catastrophic failure probability may well justify its incorporation in future engine designs.

Accordingly, it has been proposed in the past to incorporate redundant turbine disc designs of various varieties into gas turbine engines, the designs generally consisting of multiple, generally parallel coaxial plates attached together to form a redundant disc structure. In the event of structural failure of one disc plate, it is the intent of these designs that the remaining plates pick up the extra load. However, examination and tests have shown that in designs of the bolted variety (multiple plates or discs, bolted together) the critical crack length is generally too small to permit unloading of the failed disc and the expected load shift would generally not occur before the crack reaches this critical length. Furthermore, bolts alone will not normally support a failed disc.

Alternatively, it has been proposed that instead of separate plates the entire disc be machined from a single forging with internal cavities formed by electrochemical machining. This leaves integral ribs between the disc sections. The same result might be obtained by separately machining two disc halves and fusion bonding them together. The problem with such an integral multidisc is that there are no longer any boundaries totally separating the multiple sections, and cracks initiating in one disc half may well propagate to the other with catastrophic results.

The problem facing the disc designer, therefore, is to provide a redundant disc wherein any failure is contained such that the probability of secondary failure and secondary damage is minimized.

SUMMARY OF THE INVENTION

Accordingly, it is the primary object of the present invention to provide a rotatable disc of the variety wherein a failure is totally contained.

It is a further object of the present invention to provide an improved method for fabricating a disc having inherent redundancy to contain any failure due to defects in the disc.

These and other objects and advantages, will be more clearly understood from the following detailed description, the drawings and specific examples, all of which are intended to be typical of rather than in any way limiting to the scope of the present invention.

Briefly stated, the above objectives are accomplished in a rotatable disc comprising a plurality of generally parallel plates tightly joined together for rotation about a hub. At least one face surface of each plate is provided with a plurality of alternating lands and grooves, the lands projecting from the face and running in the generally radial direction. The lands of each plate are interposed within the grooves of the next adjacent plate, the fit being such that, in the event of a crack in one plate, the cracked plate will not be permitted to expand circumferentially without the adjacent plate picking up its load. Furthermore, the lands (or ribs) tend to isolate propagation of a defect to a small segment of the plate. Because of the physical boundary between adjacent plates, cracks in one plate will not be able to cross over to another plate. In one embodiment, the plates are prevented from separating laterally by means of splines which are inserted between adjacent lands, in the generally radial direction, to interlock the lands and, thus, the plates.

Additionally, a method is proposed for fabricating a disc of the redundant variety consistent with the foregoing structural innovations.

BRIEF DESCRIPTION OF THE DRAWINGS

While the specification concludes with claims particularly pointing out and distinctly claiming the subject matter which is regarded as part of the present invention, it is believed that the invention will be more fully understood from the following description of the preferred embodiment which is given by way of example with the accompanying drawings in which:

FIG. 1 is a schematic, cut-away representation of a gas turbine engine incorporating the subject invention;

FIG. 2 is an exploded view of a gas turbine engine turbine disc constructed in accordance with the present invention;

FIG. 3 is an enlarged view of the turbine of FIG. 1 and assembled in accordance with the present invention;

FIG. 4 is a partial cross-sectional view taken along line 4—4 of FIG. 3;

FIG. 5 is a partial cross-sectional view similar to FIG. 4 and depicting an alternative embodiment of the present invention; and FIG. 6 is a partial cross-sectional view similar to FIG. 4 and depicting yet another alternating embodiment of the present invention.

DESCRIPTION OF THE PREFERRED EMBODIMENT

Referring to the drawings wherein like numerals correspond to like elements throughout, attention is first directed to FIG. 1 wherein a gas turbine engine designated generally at 10, and which incorporates the subject invention, is diagrammatically shown. Briefly stated, the engine 10 comprises an axial flow compressor 12 which pressurizes air entering inlet 14 to support combustion of fuel in combustor 16. The hot gas stream generated by combustor 16 is expanded through and drives turbine 18, which, in turn, is drivingly connected to the rotor portion 20 of compressor 12 by shaft 22 in the usual manner of a gas turbine engine. The expanded gases from turbine 18 are discharged through a nozzle 24 to provide a propulsive thrust to the left in FIG. 1.

Directing attention now to FIGS. 2 and 3, the disc portion 26 of turbine 18, and the subject of the present invention, is depicted in greater detail. Therein, it will be seen that disc 26 comprises two rotor plates 28 which, when assembled, would comprise a disc symmetrical about a radial plane therebetween. Provided at the rim of each plate 28 are a plurality of circumferentially spaced dovetail slots 30, each shaped to receive a complementary root portion 32 of a turbine rotor blade 34. The plates are indexed such that their respective dovetail slots are aligned, one slot from each plate engaging a single blade root 32.

Since each plate 28 is unsymmetrical about a radial plane, the plates will have a tendency to distort and separate at high rotational speeds. This can be countered by fastening the two plates together in a manner now to be discussed such that, if one plate fails due to inherent defects such as cracks, its tangential stress load will be transmitted to the other plate.

Accordingly, each plate is provided with a plurality of equally angularly spaced lands 36 projecting axially from at least one plate face and extending in a generally radial direction from the hub 38 to the rim. Between each pair of lands is a groove 40 of a width substantially the same as the lands. While not so limiting, the lands and grooves are generally rectangular in cross section and adapted to intermesh in the manner of gear teeth as clearly shown in the cross-sectional view of FIG. 4. In fact, the intermeshing is such that each land 36 bottoms out in a complementary groove 40 of the adjacent plate. The plates are tightly joined together in the embodiment of FIGS. 2 and 3 by means of a plurality of bolts 42 inserted through cooperating holes 44 in each plate 28.

In accordance with the present invention, each plate is sized to carry its pro rata share of the rim load due to the presence of turbine blades 34. In addition, each plate is sized to carry the load of the other plate in the event that the other plate develops a defect such as a crack therein. Consider a crack 46 which has propagated to, or started at, the rim. Because of the relatively tight fit between adjacent intermeshing lands 36, crack 46 in FIG. 4 will be prevented from spreading apart and the failed disc plate will be prevented from unwrapping circumferentially so as to induce a second failure at another point. Thus, the failure is contained since no loose fragments are formed. Notice also that since there exists a physical discontinuity (barrier) between plates 28, the crack will not be able to propagate from one plate to another. And, the intact plate, having been initially designed to carry such piggy-back loading, will provide the redundancy necessary to maintain the disc intact, at least until the system can be brought to a stop. While it is conceivable on very large diameter turbines that tip rubs will occur when one plate fails, no pieces should be broken off to create the potential of secondary damage.

In a recent study on a large-diameter, high bypass ratio gas turbofan engine, it was determined that the aforementioned redundant approach to disc fabrication necessitated the addition of approximately 44.5 Kg (98 lbs.) over the standard, single-piece, forged, high-pressure turbine disc while the life cycles to crack initiation were increased by over a factor of three, and the cycles to failure from initial defect propagation were increased by over a factor four. All this was accomplished with a correspondingly significant improvement in turbine overspeed capability. While at first blush it may appear that 98 lbs. is an inordinate amount of weight increase, consider that it would require over 200 lbs. of armor plating around the turbine section to contain a standard disc in event of rupture, since the kinetic energy available for penetration for a 180° sector fragment of a typical standard disc is over one million foot pounds at typical gas turbine engine operating conditions.

FIGS. 5 and 6 depict an alternative embodiment of the present invention wherein the bolts 42 of FIG. 3 have been eliminated. While acceptable at lower rotational speeds, the presence of bolt holes will tend to weaken the structure. Accordingly, their elimination is desirable where extremely high loadings and speeds are anticipated. Referring first to FIG. 5, it is shown that a pair of plates 28 are provided with intermeshing lands 36 substantially in the manner as hereinbefore described. However, the lands are notched at their circumferentially adjacent faces 48 to create apertures therebetween, herein diamond shaped. It will become obvious that many other aperture shapes would be equally appropriate and that the shape depicted herein is merely selected as representative of the concept. Splines 52, of a cross section complementary to apertures 50, are inserted radially from the rim of the disc, their inward movement being limited by either longitudinal taper or by built-in stops (not shown). Radially outward movement may be prevented by the presence of overlying blades, by a collar inserted around the rim, by staking, or by any of numerous other techniques not necessary to reiterate herein. Due to the presence of the radial splines 52, the lands are essentially interlocked and the plates 28 are prevented from separating laterally.

It is clear that the novel concept as taught herein may be extended to a redundant disc comprised of more than two plates, in which event at least one plate would be provided with lands and grooves on two faces instead of one. Such an embodiment is shown, in part, in FIG. 6 wherein the radial spline concept of FIG. 5 has been extended to interlock three plates 28 together.

Thus, not only a structure, but a method of fabricating a redundant disc has been shown. In particular, a designer must first size a rotatable, generally circular plate so as to carry a minimum predetermined rim load plus the load of a geometrically similar plate. Such plates are then stacked together in a generally coaxial, generally parallel relationship to each other. The plates may then be intermeshed through a plurality of alternating, angularly spaced lands and grooves formed upon laterally adjacent plate faces, the lands of each plate intermeshing with the grooves of the adjacent plate to prevent relative circumferential displacement of adjacent plate sectors. Finally, the plates must be tightly joined together by means of a bolted connection, splines, or the like.

It will become obvious to one skilled in the art that certain changes can be made to the above-described invention without departing from the broad inventive concepts thereof. For example, while the invention has been directed toward application is gas turbine engine turbine discs, it is readily apparent that the concept is equally applicable to any highly loaded, rotatable wheel, such as a flywheel. Furthermore, a plurality of short splines inserted through the hub of the disc to lock the plates together, their longitudinal length being limited only by the size of the bore through which they are inserted. It is intended that the appended claims cover these and all other variations in the present invention's broader inventive concepts.

Having thus described the invention, what is claimed as novel and desired to be secured by Letters Patent of the United States is:

1. A rotatable disc comprising: a pair of, generally parallel plates for rotation about a common axis, each plate including a plurality of angularly spaced lands projecting axially from a face thereof and extending in a generally radial direction along the face, the lands of each plate intermeshing in alternating relationship with grooves formed between pairs of lands of the adjacent plate to prevent relative circumferential displacement of adjacent plate sectors; and means for tightly joining the plates together such that each land is in abutting contact with the adjacent plate; and wherein each plate is redundantly sized such that in the event of structural failure of one plate, the remaining intact plate can support the load of the failed plate.

2. The disc as recited in claim 1 wherein the lands and grooves are tapered in the generally radial direction.

3. The disc as recited in claim 1 wherein the means for joining comprises a plurality of bolts passing through and angularly spaced about the plates.

4. The disc as recited in claim 1 further characterized by a circumferentially adjacent pair of intermeshing lands, one from each plate, being notched at their adjacent faces, the complementary notches forming a radially extending aperture between the lands, and a spline shaped to conform generally to the aperture and inserted therein.

5. The disc as recited in claim 4 wherein the lands are tapered in the generally radial direction.

6. The disc as recited in claim 5 wherein the spline cross-sectional profile is of generally diamond shape.

7. The disc as recited in claim 1 further characterized by a plurality of contoured dovetail slots angularly spaced about the radially outer rim thereof, for receiving, within each slot, the root portion of a turbomachinery blade.

8. The disc as recited in claim 1 further characterized by the adjacent faces of a pair of intermeshing lands being contoured, the contoured faces cooperating to form a radially extending aperture therebetween, and a spline shaped to conform generally to the aperture for insertion therein.

9. A disc comprising a plurality of generally parallel plates for rotation about a common axis, one plate including a plurality of angularly spaced lands projecting from two oppositely directed faces thereof and extending generally radially along said faces and two adjacent plates sandwiching said one plate and provided with similar angularly spaced lands intermeshing in alternating relationship with the lands of said one plate to prevent relative circumferential displacement of adjacent plate sectors; and means for tightly joining the plates together; and wherein each plate is redundantly sized such that in the event of structural failure of one plate, the remaining intact plates can support the load of the failed plate.

10. A disc comprising a pair of generally parallel plates for rotation about a common axis, each plate including a plurality of angularly spaced lands projecting from a face thereof and extending in a generally radial direction along the face, the lands of each plate intermeshing in alternating relationship between the lands of the adjacent plate to prevent relative circumferential displacement of adjacent plate sectors; and means for tightly joining the plates together; and wherein each plate is redundantly sized such that in the event of structural failure of one plate, the remaining intact plate can support the load of the failed plate.

11. In a method of fabricating a redundant rotatable disc, the steps of redundantly sizing a rotatable, generally circular plate so as to carry a minimum rim load plus the load of a geometrically similar plate;

placing a pair of such plates in, generally parallel relationship to each other;

intermeshing the pair of plates through a plurality of alternating, angularly spaced lands and grooves formed upon laterally adjacent plate faces, the lands of each plate intermeshing within the grooves of the adjacent plate to prevent relative circumferential displacement of adjacent plate sectors; and tightly joining the plates together without bonding such that the lands are in abutting contact with the adjacent plate.

12. In the method as recited in claim 11 the further step of interlocking the plates together by inserting a contoured radial spline within a substantially similar aperture formed by notching circumferentially adjacent lands, one from each plate.

13. In a method of fabricating a redundant rotatable disc, the steps of redundantly sizing a rotatable, generally circular plate so as to carry a minimum rim load plus the load of a geometrically similar plate;
  placing a pair of such plates in generally parallel relationship to each other;
  intermeshing the pair of plates through a plurality of alternating angularly spaced lands and grooves formed upon the plates to prevent relative circumferential displacement of adjacent plate sectors; and
tightly joining the plates together without bonding.

* * * * *